United States Patent

Sauer

[11] 3,922,575
[45] Nov. 25, 1975

[54] STATOR ASSEMBLY WITH BORE SLEEVE

[75] Inventor: Francis J. Sauer, St. Louis, Mo.

[73] Assignee: Emerson Electric Co., St. Louis, Mo.

[22] Filed: Mar. 30, 1972

[21] Appl. No.: 239,570

[52] U.S. Cl. ................ 310/214; 310/86; 310/216
[51] Int. Cl.² .......................................... H02K 3/48
[58] Field of Search .......... 310/216, 217, 218, 214, 310/215, 42, 85, 86, 87, 104, 258, 259, 254, 260, 214, 46, DIG. 6; 29/205, 606; 336/210, 211

[56] References Cited
UNITED STATES PATENTS

| 1,697,142 | 1/1929  | Roller ...................... 310/104 |
| 2,573,126 | 10/1951 | Andrus ..................... 310/86  |
| 2,798,173 | 7/1957  | Penlington ................ 310/86  |
| 2,919,359 | 12/1959 | Luenberger ............... 310/86  |
| 2,993,131 | 7/1961  | Trevitt ..................... 310/86  |
| 3,053,189 | 9/1962  | White ....................... 310/86  |
| 3,143,676 | 8/1964  | Niemkiewicz ............. 310/86  |
| 3,541,361 | 11/1970 | Nola ......................... 310/46  |
| 3,733,504 | 5/1973  | Dennis ...................... 310/86  |
| 3,740,598 | 6/1973  | Hallerback ................ 310/86  |
| 3,827,141 | 8/1974  | Hallerback ................ 310/42  |

*Primary Examiner*—R. Skudy
*Attorney, Agent, or Firm*—Polster and Polster

[57] ABSTRACT

A stator assembly for a dynamoelectric machine is provided having a laminated core of magnetic material. Each lamination has a central bore opening with a plurality of slots disposed annularly about the bore. The slots are designed to receive windings and are open along the bore. The slot openings connecting the slots to the bore are a wide mouthed design which permits easy insertion of wire coils constituting the windings. The bore has a sleeve placed in it after coil insertion which abuts and closes the slots.

4 Claims, No Drawings

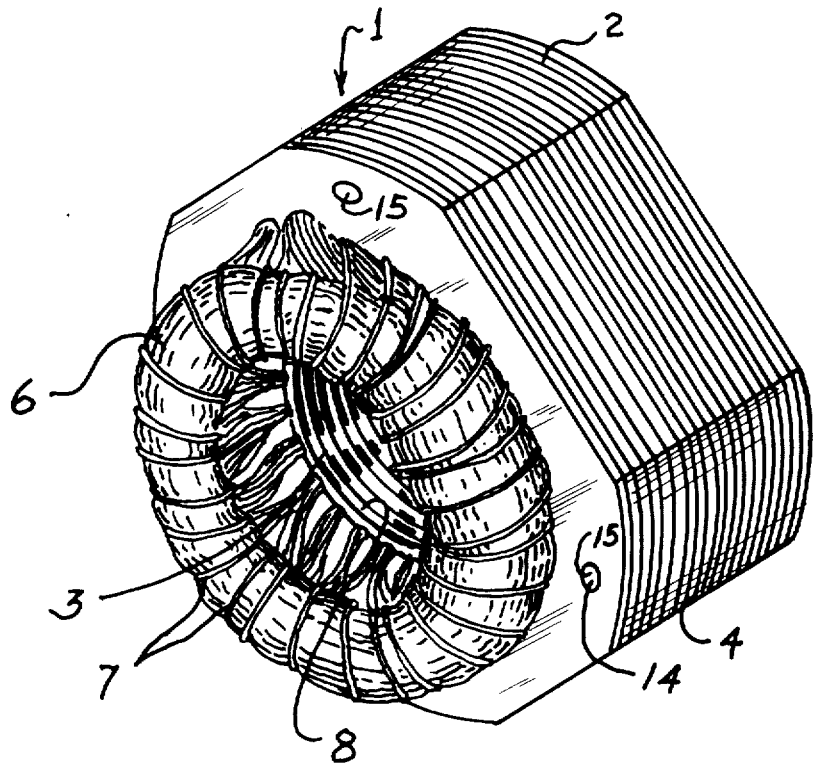

STATOR ASSEMBLY WITH BORE SLEEVE

BACKGROUND OF THE INVENTION

This invention relates to dynamoelectric machinery and in particular to novel construction of an electric motor stator. While the invention is described with particular emphasis with respect to a motor stator, those skilled in the art will recognize the wide applicability of my invention to other uses, especially in the electrical art.

The construction of the stator assembly for an electric motor commences with the manufacturing of a plurality of stator laminations. Conventionally, the laminations comprise a particular design shape which, when combined with a plurality of laminations stacked to form the core, give the stator assembly a particular design silhouette. The design silhouette is subject to change and depends, in large measure, on the particular motor application. Conventionally, each lamination has a central opening in it which defines the stator bore when the laminations are stacked in the assembled core. The bore opening has a plurality of slots disposed annularly about it, which open into the bore. The slots are closed bottomed and define a series of teeth between adjacent slots. The stacked laminations are joined by any of a variety of means known in the art. For example, cores formed by welding, cleating, adhesive bond, or combinations of each method all work well. Once the core is assembled, the motor windings are placed in the slots about the bore opening. Means for determining the winding design are well known in the art as are the motor principles involved in the combined operation of the winding and an associated rotor assembly. These principles heretofore also have dictated certain lamination features. That is, the opening between the slots and bore in prior art laminations and consequently core assemblies, is closed partially by a tooth tip. This opening, in the prior art, intentionally was as small as possible, because a small opening between the slot and bore improved motor performance. Some size opening is necessary, obviously, in order to permit winding insertion.

It has become accepted practice in the manufacture of electric motors, to axially insert prewound coils of wire into the slots of the stator core. Information on this type of winding insertion may be found in the U.S. Pat. to Hill No. 3,324,536 issued Jun. 13, 1967, and references cited therein. With this type of winding insertion method, prewound coils of wire are pulled axially upwardly through the stator bore and simultaneously partially placed within the slots of the core assembly. While this process works exceedingly well for motor manufacturing, it has certian draw-backs. For example, the above described lamination having tooth tips partially closing the stator slots, admittedly exhibiting satisfactory electrical performance, is not designed for winding insertion ease. Large wire sizes required in some motor application requirements foul on the stator teeth during axial insertion. Fouling may result in broken wires or, even more dangerous, in damage to the wire insulation. Damage to wire insulation, if not detected, can result in motor failure under application use. The pressure applied to wire in the axial insertion process usually is a function of wire size, wire mass, wound coil configuration, slot shape, slot size and slot opening. Thus, the pressure required to insert can be significantly reduced as slot opening increases. Additionally, ease of winding insertion permits use of simplified peripheral equipment in the manufacturing process. For example, the tooling associated with axial insertion may be redesigned to reduce its cost.

It also frequently is desirable to choose a particular material from the various materials used in the manufacture of electrical wire. Conventionally, wire used in the manufacture of electric motors, known as "magnet wire" is a copper wire coated with some form of wire insulation in the form of a modified polyvinyl resin, for example. It often is desirable to substitute aluminum "magnet wire" for the copper "magnet wire" heretofore used in the art. Substitution is desirable because of the large cost differential between electrically equivalent windings of copper and aluminum, aluminum generally being lower cost than copper. Because the conductivity of aluminum is approximately half that of copper, however, wire size must be increased substantially in order to obtain equivalent motor performance after substitution. In many applications, economically feasible motor production is precluded because the equivalent aluminum wire size required for substitution cannot be inserted axially. I have found that stator tooth tips heretofore prevalent on prior art lamination designs may be eliminated, or partially eliminated without motor performance degradation, if means are provided for replacing the magnetic material lost because of tooth tip elimination. Tooth tip elimination has an immediate benefit, in the context of aluminum wire insertion, in that a wide mouthed slot is provided which allows easy axial insertion of large wire sizes. Additionally, fewer manufacturing difficulties and higher wire concentrations are obtainable with all wire sizes.

One of the objects of this invention is to provide a stator lamination which, when assembled in a core, has a wide mouth opening for the stator slot.

Another object of this invention is to provide a stator assembly utilizing a bore sleeve for closing the stator slots.

Another object of this invention is to eliminate the tooth tip in lamination designs.

Other objects will be apparent to those skilled in the art in light of the following description and accompanying drawings.

SUMMARY OF THE INVENTION

In accordance with this invention, generally stated, a stator assembly is provided having a core constructed from a stack of laminations with teeth having surfaces aligned to define both a bore and coil receiving slots opening into the bore. An inner sleeve is mounted and secured against displacement on the bore defining teeth surfaces. The bore sleeve is constructed from a material having magnetic characteristics substantially the same as the material of which the laminations are made.

DESCRIPTION OF THE PREFERRED EMBODIMENT

Figure 1:
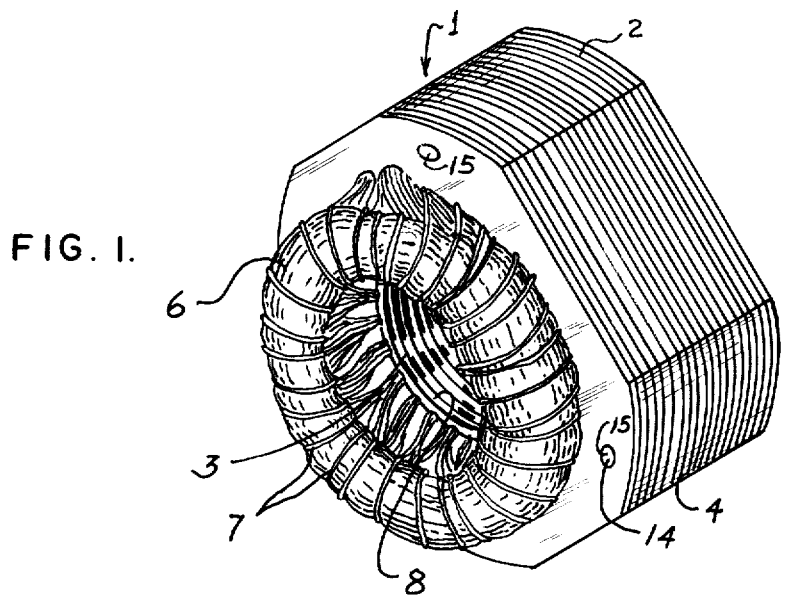
FIG. 1 is a view in perspective of an illustrative stator assembly utilizing the bore sleeve of my invention.
Figure 2:
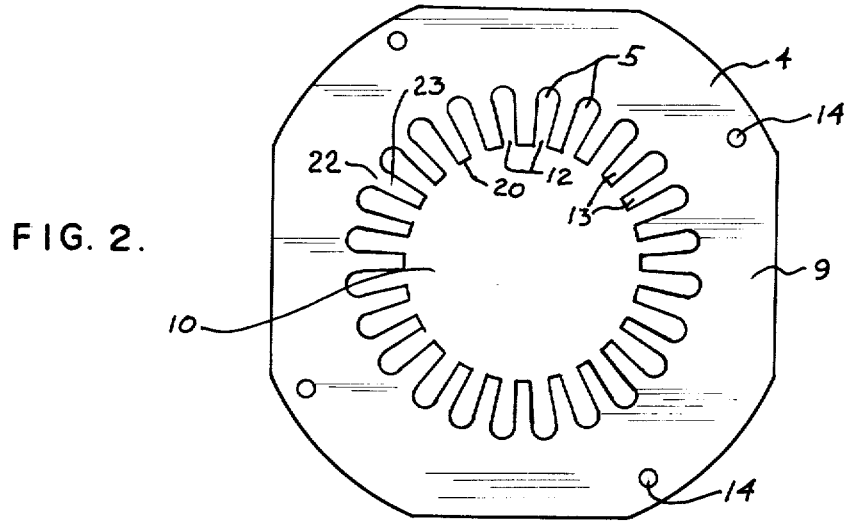
FIG. 2 is a plan view of a lamination used in the stator assembly of FIG. 1.
Figure 3:
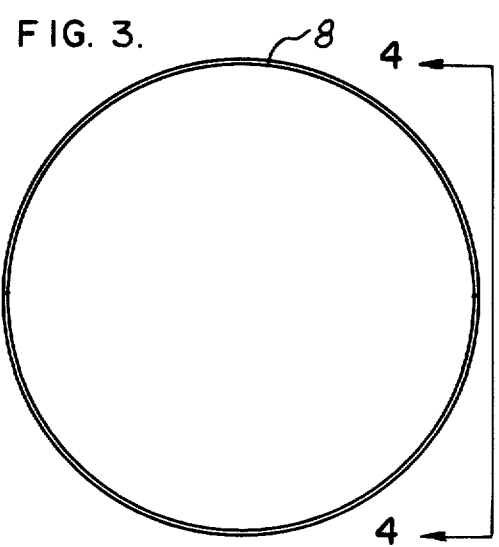
FIG. 3 is an enlarged view in end elevation of a bore sleeve used in the stator assembly of FIG. 1.
Figure 4:
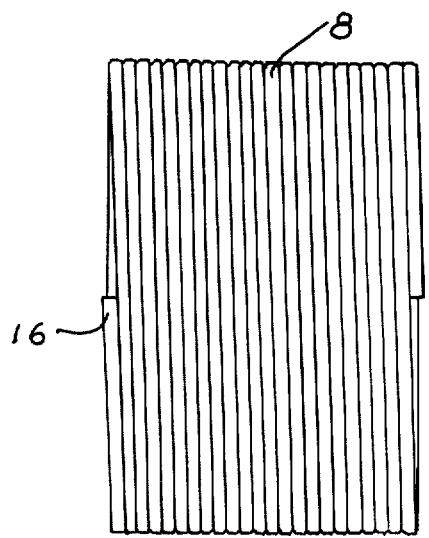
FIG. 4 is a view taken along the line 4—4 of FIG. 3.

Referring to FIG. 1, reference numeral 1 indicates an illustrative stator assembly of this invention. This stator assembly 1 includes a stator core 2, having an axial bore opening 3 through it. Core 2 is a laminated structure constructed from a predetermined stack of laminations, an individual member of which is indicated generally by the numeral 4. Each lamination 4 has a plurality of radial slots 5 in it, which are intended to hold a winding 6. The winding 6 itself forms no part of this invention. The winding 6 may be distributed along the slots 5 in any predetermined manner, and it is conventional to distribute the turns comprising the coil in a sinusoidal distribution. Merely by way of example, the winding 6 may be designed for use in a two pole, single phase induction motor and would include coils defining first and second main windings and first and second auxiliary windings. The first and second windings of both the main and auxiliary coils in turn each define a main and auxiliary pole for the motor. It is conventional, in many motor applications, to wrap the winding with a ribbon of lace 7 and the winding 6 is illustrated as so wrapped. A bore sleeve 8 closes the slots 5 in the embodiment of FIG. 1.

Each individual lamination 4 includes a broad yoke area 9 which is formed to define the particular lamination silhouette. Yoke 9 has a relatively large central opening 10 punched in it. Disposed annularly about the opening 10 are the radial slots 5. The slots 5 have a bottom 11 and an open mouth 12. The material between adjacent slots define a stator tooth 13. Each tooth 13 has a surface 20 which faces the opening 10 and acts to delimit the periphery of the opening 10. A plurality of stacked laminations, illustrated for example in FIG. 1, has each tooth 13 aligned with another tooth of an adjacent lamination. When so stacked, the teeth delimit, beside radial slots 5 and opening 10, a plurality of axial stator slots 21 and the axial bore opening 3. The tooth 13 has a root section 22 which emerges from the yoke 9, near bottom 11 of slot 5, and a stem section 23 which terminates at the surface 20. It may be observed that the mouth 12 is relatively wide in contradistinction to prior art lamination designs which were closed by tooth tips, not shown, The yoke 9, in the embodiment illustrated, has a plurality of mounting openings 14 in it. The openings 14 are conventional and form a channel 15 through the stack of laminations illustrated in FIG. 1. The channel 15 is utilized to secure the stator assembly 1 to an application mounting fixture not shown by some form of conventional means. A bolt, for example, placed through the channel 15 works well.

The bore sleeve 8 is manufactured from a strand 16. The strand 16 preferably is constructed from material similar to that used in the lamination 4 construction. Merely by way of illustration, the strand 16 may be a magnetic, soft iron wire 25 thousandths of an inch thick and 60 thousandths of an inch wide. The strand 16 is wound tightly about a suitable mandrel. That is, successive reaches of the strand 16 defines the sleeve 8. Preferably, the sleeve 8 is sized accurately in its construction so as to be approximately one thousandth of an inch less in outside diameter than the diameter of the bore 3. The sleeve 8 resembles a hollow cylinder in section. At some point in the manufacturing process, the strand 16 or sleeve 8 is coated with an epoxy adhesive. I find coating the strand 16 and winding it to form the sleeve 8 works well, but the sleeve may be coated on the mandrel. The adhesive is allowed to cure at least partially, and the sleeve is removed from the mandrel. The sleeve thereafter is inserted in the bore 3 after placement of the windings 6 and the resulting combination is dipped in a suitable varnish and baked. The dip and bake operation effectively cements the sleeve 8 to the teeth 13 along the surface 20, closing the mouth 12 of the slot 5. The sleeve 8 enables the stator assembly 1 to exhibit electrical performance equal to or better than stators constructed from laminations having conventional tooth tips closing the slot mouth. In order to achieve this performance, I have found it desirable if not necessary to wind the sleeve 8 helically, rather than utilizing a cylindrical sleeve with a solid side wall.

The mouth 12 permits easy insertion of the winding 6. As previously described, it is conventional to axially insert the winding 6. However, the wide mouth 12 between adjacent teeth 13 is designed to facilitate this method of winding insertion. Thus, conventional tooth tips are not present and wire damage due to the interaction of the tips and wire in the insertion process in eliminated. Because a greater mass of wire turns can be positioned simultaneously, slot fills under production conditions can be increased appreciably. The term "slot fill" is used in its conventional sense and refers to the total usable area of the slot filled by the winding, generally expressed as a percentage. Consequently, aluminum "magnet wire" becomes a feasible substitute in many more motor application heretofore the exclusive domain of copper "magnet wire." The cost desirability of such substitution is discussed above.

Numerous variations within the scope of the appended claims will occur to those skilled in the art in light of the foregoing description and accompanying drawings. Thus, the silhouette of the stator lamination 4 may be varied. The stack of laminations may be assembled by a variety of methods, including the above-mentioned welding, cleating or adhesive assembly. The design of the slots bottoms 11 may be changed. Bore sleeve 8 may vary in axial length. Likewise, strand 16 may vary in thickness and width. While the sleeve 8 was described as manufactured from a continuous strand 16, the sleeve 8 may be made in sections and later assembled into an integral unit. The design of tooth stem 23 may vary. While I prefer the relatively straight stem illustrated, the stem may be tapered, for example, if desired. The winding 6 may have several operations performed on it prior to sleeve 8 placement. For example, the winding 6 may be compacted mechanically within the stator slot 21 or the individual turns comprising the winding 6 may be aligned electrically. While complete removal of prior art tooth tips has been described and illustrated, the tips may be altered in size rather than completely eliminated. These variations are merely illustrative.

Having thus described the invention, what is claimed and desired to be secured by Letters Patent is:

1. A stator assembly for a dynamoelectric machine, comprising:

a core of stacked laminations, individual ones of said laminations being constructed from magnetic material having teeth with surfaces aligned to define a bore and axially extending slots opening into said bore, said teeth having root and stem sections, said stem sections having sides which are straight from the root section to the bore;

a winding including a plurality of wire turns placed in said slots in a predetermined manner; and an inner bore sleeve mounted in an secured against displacement along the bore defining surfaces of said teeth, said bore sleeve comprising a tightly wound continuous helical coil wound from a wire constructed from the same magnetic material as said laminations, said wire having a width dimension and a thickness dimension, said width dimension being substantially flat, said bore sleeve abutting the bore defining surfaces of said teeth along said flat width dimension, said coil defining a substantially cylindrical shape having a longitudinal length approximately equal to the longitudinal length of said core of stacked laminations, individual turns of said coil being bonded to one another by an epoxy adhesive at least along the thickness dimension of said wire.

2. The stator of claim 1 wherein the bore sleeve is a single layer of continuous wire coil.

3. The stator of claim 1 wherein said bore sleeve has a gap in it extending in a direction through the bore.

4. The stator assembly of claim 1 wherein said stem section of said teeth is straight from the root section to a location short of the bore.

* * * * *

UNITED STATES PATENT OFFICE
CERTIFICATE OF CORRECTION

Patent No. 3,922,575   Dated November 25, 1975

Inventor(s)   Francis J. Sauer

It is certified that error appears in the above-identified patent and that said Letters Patent are hereby corrected as shown below:

Column 3, line 61, after "strand 16" insert ---are wound in tightly abutting relationship. The wound strand 16---

Signed and Sealed this twenty-third Day of March 1976

[SEAL]

Attest:

RUTH C. MASON
Attesting Officer

C. MARSHALL DANN
Commissioner of Patents and Trademarks